Feb. 10, 1925.

W. J. COOK

VALVE TURNER

Original Filed Oct. 7, 1921

1,525,800

INVENTOR
William J. Cook
BY
ATTORNEY

Patented Feb. 10, 1925.

1,525,800

UNITED STATES PATENT OFFICE.

WILLIAM J. COOK, OF BROOKLYN, NEW YORK, ASSIGNOR, BY MESNE ASSIGNMENTS, TO THE AUTOMOTIVE SPECIALTY CORPORATION, OF NEW YORK, N. Y., A CORPORATION OF NEW YORK.

VALVE TURNER.

Application filed October 7, 1921, Serial No. 505,999. Renewed October 4, 1924.

*To all whom it may concern:*

Be it known that I, WILLIAM J. COOK, a citizen of the United States, and resident of the borough of Brooklyn, county of Kings, State of New York, have invented certain new and useful Improvements in Valve Turners.

The device the subject of this invention which I have termed a valve turner is intended as a means for operating valves or pet-cocks and more particularly the latter and when so positioned as not to be readily reached by the hand of the operator.

Pet-cocks so positioned are found on automobiles and numerous other machines or devices, and on automobiles I have in mind particularly the gear case draining means and the valve employed for draining the radiator and also the cock or valve employed for draining certain types of transmissions or clutch cases where a light oil is used as the lubricant.

The particular advantages of this invention and its method of operation will be set forth in the specification which follows, and the accompanying drawing should be referred to for a full and complete understanding of the specification.

In the drawing.

Similar reference numerals indicate like parts in all the figures where they appear.

At 1, I indicate a staff or body member that may be of any length. This member is preferably formed of wire or metal rod of any desired thickness and at one end of this rod I form a ring or hand member 2, which may be utilized for holding or supporting the device or for rotating when rotary motion shall be desired.

At the opposite end of the member 1, the rod is turned into a flattened coil, the convolutions of which are close together, and the extreme end of the rod should be cut at an angle as indicated at 3, so as to prevent the formation of a projection or abutment which would result if the rod were cut straight off.

Figure 1:
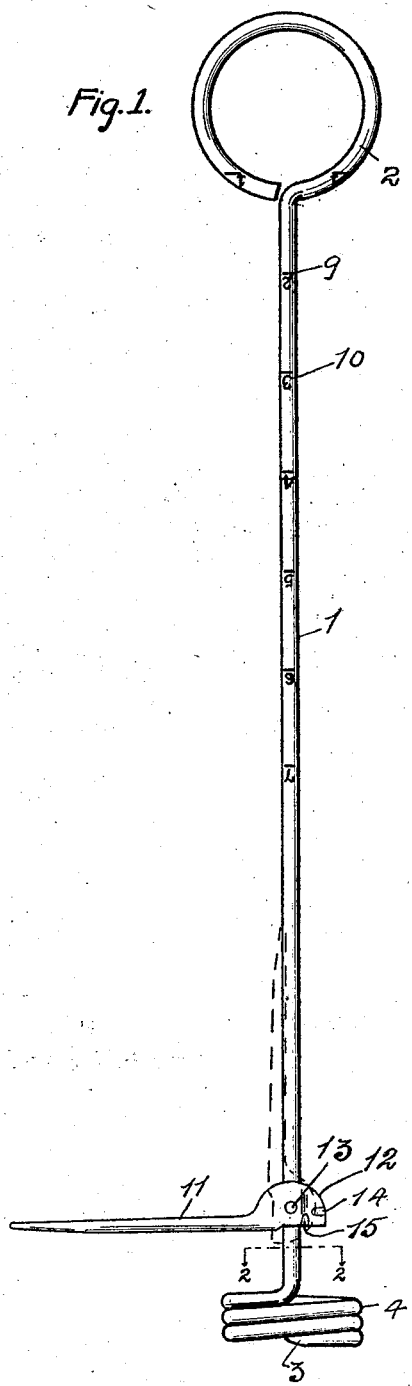
Figure 1 is a side elevation.
Figure 2:
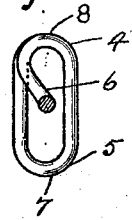
Fig. 2 is an end elevation partly in section, the view and section being taken on the line and arrows 2—2 in Fig. 1.

Any number of convolutions may be made, but in the drawing I show three complete turns each extending approximately equal distances from the axial center of the rod 1, and as shown at 5 and 4 in Fig. 2 and it will also be noted that the first convolution is bent inward as shown at 6 so that the rod will extend away from the center line of the flattened coil.

The flattened coil produces a socket well adapted to receive the head or thumb-piece of a key valve or pet-cock, and the return bends or loops 7 and 8 extending as they do around the ends will prevent the thumb-piece from passing from between the flattened portions of the coil and also will sustain the device, retaining it upon the valve head and preventing the tool from dropping away from the valve thus making the operation much less difficult.

Upon the staff 1 and loop or handle 2 I provide a plurality of lines and numerals as indicated at 9 and 10. These lines 9 are spaced predetermined distances apart and the numerals may be arranged in series or in any other manner or other markings may be employed and I prefer that the lines should be so spaced as to indicate the amount of gasoline, oil, or other liquid contained in a tank not provided with a gage.

Upon the staff 1, I also arrange a pointed spoon member 11, the inner end of which is provided with parallel enlarged portions 12, which are pivoted to the staff 1 by means of a pin 13. This spoon member may be formed of sheet metal that has a certain degree of resiliency and the enlarged portions arranged one on each side of the staff 1, are each provided with inward depressions 14 and 15 which engage the staff 1 at one side thereof retaining the staff between the abutment and the shoulder or body of the spoon to hold the spoon member in either position; that shown in full lines which is the operable position, or that shown in dotted lines which is the closed position.

This spoon member is used to clean out or clear the passage through a valve or cock, and has the advantage that it will not push the dirt or dust back into the oil tank as does a rod or pin.

The number of convolutions and the width and length of the flattened coil may be changed at will, and other modifications may be made within the scope of the appended claims without departing from the principle or sacrificing the advantages of the invention, Having described my invention what I claim and desire to secure by Letters Patent is as follows:

1. Means for operating a valve comprising a rod turned into a flattened spiral to form a socket, the inner end of said spiral being bent inward to approximately the center of said socket.

2. Means for operating a valve comprising a rod turned into a flattened spiral to form a socket thereon, the inner end of said spiral being bent inward to the axial center of said socket and a ring-shaped operating handle formed on said inner end.

Signed at the city, county and State of New York, this 9th day of September, 1921.

WILLIAM J. COOK.